(12) United States Patent
Van Decker et al.

(10) Patent No.: US 8,251,133 B2
(45) Date of Patent: *Aug. 28, 2012

(54) HELICAL COIL-ON-TUBE HEAT EXCHANGER

(75) Inventors: Gerald W. E. Van Decker, Waterloo (CA); Colin M. Watts, Ottawa (CA)

(73) Assignee: Renewability Energy Inc., Ottawa Ontario (CA)

(*) Notice: Subject to any disclaimer, the term of this patent is extended or adjusted under 35 U.S.C. 154(b) by 93 days.

This patent is subject to a terminal disclaimer.

(21) Appl. No.: 11/902,612

(22) Filed: Sep. 24, 2007

(65) Prior Publication Data

US 2008/0017361 A1 Jan. 24, 2008

Related U.S. Application Data

(62) Division of application No. 10/779,844, filed on Feb. 18, 2004, now Pat. No. 7,322,404.

(51) Int. Cl.
*F28D 7/02* (2006.01)

(52) U.S. Cl. ........................ 165/156; 165/164

(58) Field of Classification Search ............ 165/47, 165/156, 164
See application file for complete search history.

(56) References Cited

U.S. PATENT DOCUMENTS

| | | | |
|---|---|---|---|
| 1,840,940 A | 1/1932 | Ecabert | |
| 1,926,342 A | 9/1933 | Lippencott | |
| 1,965,553 A | 7/1934 | Lear | |
| 2,137,044 A | 11/1938 | Dawson | |
| 2,653,013 A | 9/1953 | Freer | |
| 2,697,868 A | 12/1954 | Arant | |
| 3,460,611 A * | 8/1969 | Tramuta et al. | 165/166 |
| 4,015,567 A | 4/1977 | Zabenskie | |
| 4,203,392 A * | 5/1980 | McLane | 122/18.3 |
| 4,253,225 A | 3/1981 | Wright et al. | |
| 4,256,176 A | 3/1981 | Cohen | |
| 4,289,196 A | 9/1981 | Jabsen et al. | |
| 4,304,292 A | 12/1981 | Cardone et al. | |
| 4,341,263 A | 7/1982 | Arbabian | |
| 4,346,759 A | 8/1982 | Cohen et al. | |
| 4,352,391 A | 10/1982 | Jonsson | |

(Continued)

FOREIGN PATENT DOCUMENTS

CH 365 493 9/1962

(Continued)

OTHER PUBLICATIONS

Third party observation made by David Nasseri for application No. EP05706492, entitled "Method for heating fresh water", with publication No. EP1723375. (7 pages).

*Primary Examiner* — Allen Flanigan
(74) *Attorney, Agent, or Firm* — Maier & Maier PLLC

(57) ABSTRACT

A coil on tube heat exchanger is provided that uses multiple parallel helical coil tubes to limit liquid pressure losses while providing similar performance and production times to previous coil and tube designs. Two or more coil tubes are wrapped together around a center tube in a helical fashion, permitting the heat exchanger to be used in a counter-flow, or contra-flow, implementation. Use of the heat exchanger includes flowing a first liquid, such as waste water, through the center tube and flowing a second liquid through the plurality of channels. Embodiments of the present invention provide reduced pressure loss, higher performance and are generally faster to manufacture than prior heat exchangers.

14 Claims, 6 Drawing Sheets

U.S. PATENT DOCUMENTS

| | | | |
|---|---|---|---|
| 4,371,036 A | | 2/1983 | Fordsmand |
| 4,372,372 A | * | 2/1983 | Hunter ............... 165/47 |
| 4,451,960 A | | 6/1984 | Molitor |
| 4,599,773 A | | 7/1986 | Sievers |
| 4,602,672 A | * | 7/1986 | Kaufmann ............ 165/47 |
| 4,619,311 A | | 10/1986 | Vasile et al. |
| 4,697,636 A | | 10/1987 | Mellsjo |
| 4,893,672 A | | 1/1990 | Bader |
| 5,228,505 A | | 7/1993 | Dempsey |
| 5,249,623 A | | 10/1993 | Muller et al. |
| 5,379,832 A | | 1/1995 | Dempsey |
| 5,423,378 A | | 6/1995 | Dillenbeck et al. |
| 5,791,401 A | * | 8/1998 | Nobile ............... 165/47 |
| 6,076,597 A | | 6/2000 | Manning et al. |
| 6,546,999 B1 | | 4/2003 | Dienhart et al. |
| 6,662,592 B2 | | 12/2003 | Ross et al. |
| 6,988,542 B2 | | 1/2006 | Hughes et al. |
| 2004/0159110 A1 | | 8/2004 | Janssen |
| 2004/0206485 A1 | | 10/2004 | Ferraro |

FOREIGN PATENT DOCUMENTS

| | | |
|---|---|---|
| DE | 3011111 A1 | 10/1981 |
| EP | 0 513 705 | 11/1992 |
| JP | 10227782 | 2/2000 |
| JP | 2005 061771 | 3/2005 |
| WO | WO 80/01468 | 7/1980 |
| WO | WO99/24765 | 5/1999 |
| WO | WO03/036178 | 5/2003 |

* cited by examiner

HELICAL COIL-ON-TUBE HEAT EXCHANGER

CROSS-REFERENCE TO RELATED APPLICATIONS

This application is a division of U.S. patent application Ser. No. 10/779,844 filed Feb. 18, 2004 now U.S. Pat. No. 7,322,404.

FIELD OF THE INVENTION

The present invention relates generally to heat exchange devices. More particularly, the present invention relates to coil-on-tube heat exchangers.

BACKGROUND OF THE INVENTION

Heat exchange devices, or heat exchangers, are devices for transferring heat from one medium to another, typically from one fluid to another or to the environment, without allowing the fluids to mix. Some examples are: automobile radiators; air conditioners, which use both a condenser and an evaporator; and steam and hot water radiators, which are used to produce heat. In order to prevent mixing of the fluids, or liquids, a barrier is provided between the two liquids or media. Many different heat exchanger barrier designs are used. In a "plate and frame" design, which is very compact, two liquid streams pass on opposing sides of one or more plates. The total heat transfer surface may be increased by increasing the area of plates and the number of plates. In a "tube and shell" design, one stream of liquid flow passes through the tube(s) and the other through the remaining space inside a shell that surrounds the tubes. A special subcategory the tube and shell design would be an immersion coil type design, such as a heating coil in a tank. However, both the "plate and frame" and "tube and shell" designs are susceptible to fouling and clogging. These drawbacks are considerable when considering applications relating to treatment of waste water.

A particular application of heat exchangers is in the area of waste water heat reclamation or "recovery". There are many examples of both "tube and shell" and "plate and frame" waste water systems. However, many of these systems often require a filter, because they are susceptible to clogging and/or fouling due to the nature of their design. Also, in addition to the heat exchanger itself, it is often necessary to have an elaborate apparatus to perform the actual waste water treatment. Some of these systems include coils, but these coils are often a part of a tube and shell design, such as an immersion coil.

Helical coil-on-tube heat exchangers have been in use for some time. This type of heat exchanger typically consists of a single coil that is wrapped around a tube. Prior coil-on-tube heat exchangers have been used as direct-fired water heaters, in which combustion takes place within the tube, warming the liquid in the coil. Coil-on-tube heat exchangers are also used for waste-water heat recovery.

Typical liquid flow rates have traditionally been modest using the single coil design. More recent applications of this class of heat exchanger, such as wastewater heat recovery, have resulted in much higher liquid flow rates. Coil-on-tube type heat exchangers have a significant advantage in waste-water applications as the center tube allows the waste water to pass through easily without clogging. Production rates for single-coil-on-tube heat exchangers are low and provide good performance.

However, in many applications, desired flow rates result in a large pressure loss in single-coil designs. The loss is generally proportional to the distance travelled in the coil, the second order of the flow rate, and is inversely proportional to the cross-sectional area. When long lengths of coil are required, the resulting pressure loss is not acceptable for many applications.

By increasing the number of liquid pathways on the coil side of the heat exchanger, pressure loss can be reduced. Coil-on-tube heat exchangers having multiple coils exist, with different designs being typically used for different applications. The number of coils used depends on the maximum desired flow rate. The higher the desired flow rate, the more coils are needed to keep pressure losses to a reasonable amount. For example, in a single residential installation, such as most houses, a ½ inch nominal tube is used for a coil, and 1 to 2 coils are used. For apartment buildings, 2 to 4 coils are typically used, and in commercial settings (such as health clubs, etc.), several coils are typically used by manifolding heat exchangers. Each design is not necessarily limited to a given application (a 4 coil unit could be used for a commercial or a residential application). The important thing is that the number of coils be high enough to keep the pressure loss low enough for the flow rate in a given application.

FIG. 1 illustrates a conventional heat exchanger with multiple coils, each provided as single-coil helixes. In such a known design of a heat exchanger 10, a center tube 12 is provided having a center tube inlet end 14 and a center tube outlet end 16. In the two-coil heat exchanger 10 of FIG. 1, a first coil 18 is located around a first portion of the tube 12 and a second coil 20 is located around a second portion of the tube 12. The first coil 18 has a first coil inlet end 22 provided near the center tube outlet end 16 and a first coil outlet end 24 provided near the mid-point of the length of the center tube 12. The second coil 20 has an inlet end 26 provided near the mid-point of the length of the center tube 12 and an outlet end 28 provided near the center tube inlet end 14. The use of the terms inlet and outlet ends above presumes that a liquid flow in the center tube 12 is in a different direction that the liquid flow in the first and second coils 18 and 20.

The total liquid inflow for the coils is thus divided into two so that a portion of the incoming liquid flows to each of the two coils 18 and 20, entering at an the inlet end thereof. This reduces the overall liquid pressure loss through the coils as compared to the single coil design. However, to accomplish this, a header or manifold is required to connect the multiple coils together, since the inflow points and outflow points of the heat exchanger are spread out over the length of the center tube. The different coils will not perform their function without the header, since without the header the inflow could only reach the first coil, and the outflow of the first coil could not output at the outflow end of the center tube. The header can include an inflow header 30 and an outflow header 32, connecting the inflow and outflow ends of the coils, respectively.

Although the coils are able to treat flows of liquid in parallel with each other, the coils are themselves placed on succeeding distinct longitudinal sections of the center tube. As mentioned above, the treatment of parallel flows of liquid requires that the heat exchanger include the header. The need for a header requires additional production time, as well as additional installation time.

Some heat exchanger designs have been found to be more efficient than the multiple-coil coil-on-tube heat exchanger shown in FIG. 1. "Counter-flow" (or "contra-flow") heat exchangers are known to be one of the most efficient, or effective, classes of heat exchangers. In a counter-flow heat exchanger with a plurality of coils, the temperature difference between the liquids is substantially constant along its length. Generally, a cold water flow enters a coil at one end of the heat exchanger, and a warm water flow enters another coil at the other end of the heat exchanger. The warm water flow provides heat to the cold water flow, and the warm water flow gets cooler as it travels along the heat exchanger, while the cold water flow gets warmer as it travels along the heat exchanger. If the cold and warm water flows were to enter the heat exchanger at the same end, there would be a large temperature difference at that end, and a much smaller temperature difference at the other end. This parallel flow case is limited to a maximum heat exchanger effectiveness of about 50%.

Therefore, taking a look at the multiple-coil-on-tube heat exchanger of FIG. 1, it is not a true "counter-flow" (or "contra-flow") heat exchanger. The reason it is not a true counter-flow heat exchanger is that the incoming cold stream is split so that part of it starts half-way along, and part of it ends half-way along. To be a true counter-flow heat exchanger, all of the first flow has to travel in a substantially opposite direction to the second flow along the entire length of the heat exchanger for both flows, in order to provide a constant temperature difference along the length of the heat exchanger. For this, the input of the cold stream is generally at the opposite end of the heat exchanger from the input of the warm stream in a counter-flow heat exchanger.

In summary, although single-coil heat exchangers of the helical coil-on-tube type have reasonable production rates and perform well since they can be implemented as counter-flow heat exchangers, they can also incur significant pressure losses. Multiple coil-on-tube heat exchangers are able to overcome some of the pressure loss problems of single-coil designs, but they require additional headers to treat the liquids, and their performance is not as efficient as they could be, since they are not true counter-flow heat exchangers.

Therefore, it is desirable to have a type of heat exchanger that provides similar performance and production times to the single-coil design, while improving on the lower efficiency and need for additional equipment of the multiple-coil design.

SUMMARY OF THE INVENTION

It is an object of the present invention to obviate or mitigate at least one disadvantage of previous coil-on-tube heat exchangers.

In an aspect, the present invention provides use of a coil-on-tube heat exchanger for the exchange of heat from a waste water flow to a second liquid flow. The heat exchanger includes a center tube for the waste water flow, and a plurality of channels for a second liquid flow. The plurality of channels are helically wrapped in a parallel relationship along the length of the center tube, each of the plurality of channels being in contact with the center tube and extending substantially along the same length of the center tube. The use includes flowing a first liquid through the center tube and flowing a second liquid through the plurality of channels. At least some of the plurality of channels, or all of the plurality of channels, can be provided as a plurality of coil tubes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
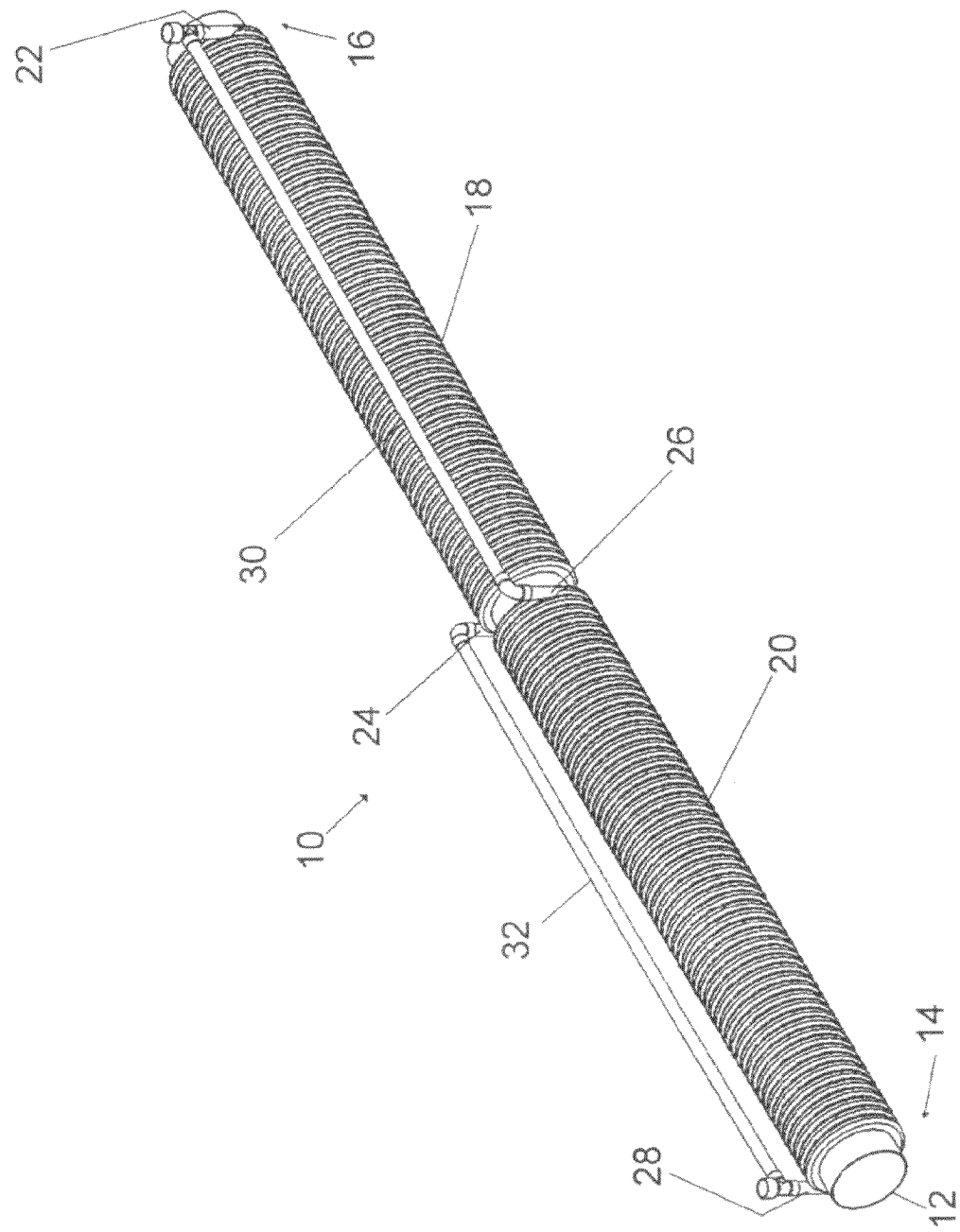
FIG. 1 illustrates a perspective view of a conventional coil-on-tube heat exchanger.

Generally, the present invention provides a coil on tube heat exchanger that uses multiple parallel helical coil tubes to limit liquid pressure losses while providing similar performance and production times to previous coil and tube designs. Two or more coil tubes are wrapped together around a center tube in a helical fashion, permitting the heat exchanger to be used in a counter-flow, or contra-flow, implementation. Use of the heat exchanger includes flowing a first liquid, such as waste water, through the center tube and flowing a second liquid through the plurality of channels. Embodiments of the present invention provide reduced pressure loss, higher performance and are generally faster to manufacture than prior heat exchangers.

The term "counter-flow" (or "contra-flow") is applied to a heat exchanger where the liquid flows are in opposing directions. This is desirable as it results in the most efficient (or "effective") classes of heat exchanger. In a counter-flow heat exchanger having a plurality of coils, the temperature difference between the liquids is substantially constant along the length of the heat exchanger. In general, to be a true counter-flow heat exchanger, all of a first liquid flow has to travel in a substantially opposite direction to a second liquid flow. It should be noted that a heat exchanger may be designed and intended as a counter-flow heat exchanger but it may not necessarily be installed in this manner if one side of the connections are installed reverse to what is intended.

The term "tube" or "coil tube" as used herein represents any stationary tube, pipe or channel, of any material that can be used to transport liquid. The present invention is not limited to pipes that are cylindrical in shape, as pipes of any cross-section may be used.

The term "flow-splitting" or other references to liquid flow being split as used herein represents splitting flow, equally or not equally, from one or more inflow tubes to a plurality of outflow tubes. The end result is that the flow is split into multiple tubes so that a higher volume of flow can be treated with a modest pressure loss, as opposed to using a single larger tube. For example, in a header or manifold, the incoming flow is split into two or more outgoing flows.

The term "liquid" as used herein represents any liquid, such as water, a chemical substance, or any other aqueous solution, liquid or semi liquid substance, such as drain water, waste water or other waste liquid, sludge, grey water, black water or any liquid having solid and/or semi-solid components.

The term "in a parallel relationship", as used herein in relation to coil tubes being helically wrapped in a parallel relationship along the length of the center tube, represents the coil tubes being located side by side and coiled together along the center tube. The parallel relationship refers to the physical location of the tubes in relation to each other.

The term "substantially co-located", as used herein in relation to ends of coil tubes being substantially co-located, represents each of the ends being located in substantially the same region of the center tube around which they are wrapped. They can be at a particular end of the center tube, but can alternatively be at any point along the length of the center tube.

Figure 2:
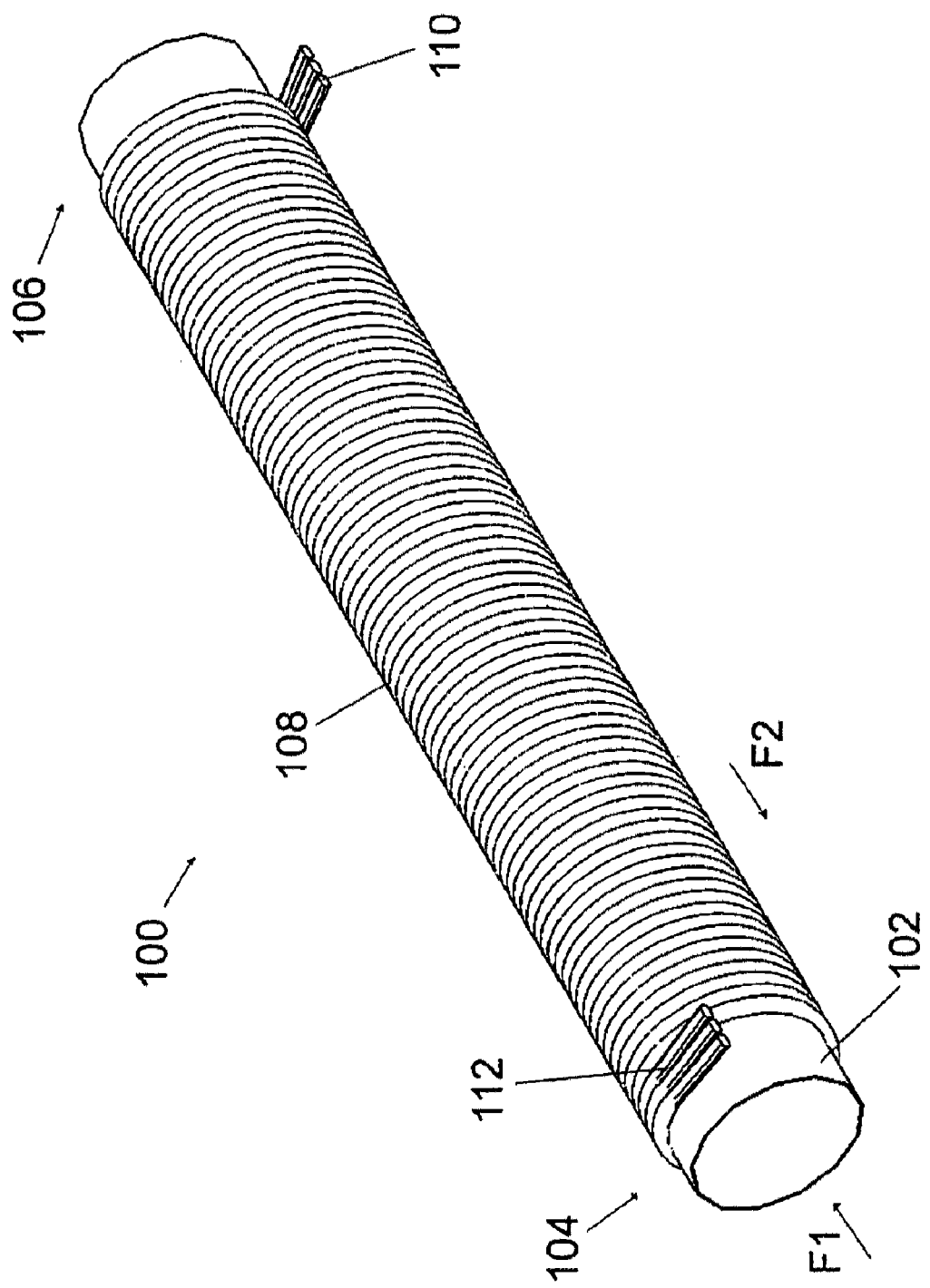
FIG. 2 illustrates a perspective view of a coil-on-tube heat exchanger according to an embodiment of the present invention.

FIG. 2 illustrates a perspective view of a coil-on-tube heat exchanger according to an embodiment of the present invention. The heat exchanger 100 includes a center tube 102 for a first liquid flow, such as drain water flow, having a center tube inflow end 104 and a center tube outflow end 106. A plurality of coils, or coil tubes, 108 are provided for a second liquid flow, such as fresh water flow, each having a coil tube inflow end 110 and a coil tube outflow end 112. The plurality of coil tubes 108 are helically wrapped in parallel with each other along the length of the center tube, preferably along substantially the entire length of the center tube. In contrast to known counter-flow and coil-on-tube heat exchangers, each of the plurality of coil tubes 108 is in contact with the center tube 102. Each of the plurality of coil tubes 108 also extends substantially along the same length of the center tube, preferably along substantially the entire length of the center tube.

Embodiments of the present invention are preferably used to recover heat from warm flows of wastewater, but the invention is not limited to these applications. For example, the heat from wastewater in the center tube 102 flowing in a direction F1 is preferably used to heat freshwater flowing in a direction F2 in the plurality of coil tubes 108. For this reason, it is advantageous according to embodiments of the present invention that each of the plurality of coil tubes 108 is in contact with the center tube 102, so that the benefit of the warm flows of wastewater can be applied to liquid flowing in each of the plurality of coil tubes 108. Although the liquid flows in the coil tubes 108 in a direction that appears somewhat perpendicular to F1, the liquid in the coil tubes 108 progresses along the heat exchanger in a direction F2, and therefore creates a counter-flow heat-exchanger.

Though the embodiment of FIG. 2 is shown with the liquid flows F1 and F2 so that the heat exchanger is a counter-flow heat exchanger, the same device can be used with liquid flows F1 and F2 being in substantially similar, or substantially parallel, directions. Occasionally this is a desirable method of installation, as is known to those of skill in the art.

With the design of a heat exchanger 100 as shown in FIG. 2, the plurality of coil tubes can be two or more tubes that are wrapped together around the center tube to form a helix. A result of this design is that in a presently preferred embodiment, the flows of liquid through the plurality of coil tubes 108 begin/end at the same end of the tube 102, forming a counter-flow heat exchanger. In other words, the coil tube inflow ends 110 are preferably each provided at or near the center tube inflow end 104. The coil tube outflow ends 112 are preferably each provided at or near the center tube outflow end 106. This provides a lower loss in liquid pressure through the coil tubes 108 as opposed to a heat exchanger having a single helical around the center tube, as is known in the prior art.

To summarize the general embodiment shown in FIG. 2, a coil-on-tube heat exchanger is provided having a center tube for a first liquid flow. The heat exchanger includes a plurality of coil tubes for a second liquid flow. The coil tubes are helically wrapped in parallel with each other along the length of the center tube. Each of the plurality of coil tubes is in contact with the center tube and extends substantially along the same length of the center tube, preferably substantially along the entire length of the center tube. The heat exchanger according to aspects of the present invention is commonly used for wastewater heat recovery, where the first liquid flow is a drain water flow and the second liquid flow is a fresh water flow.

Figure 3:
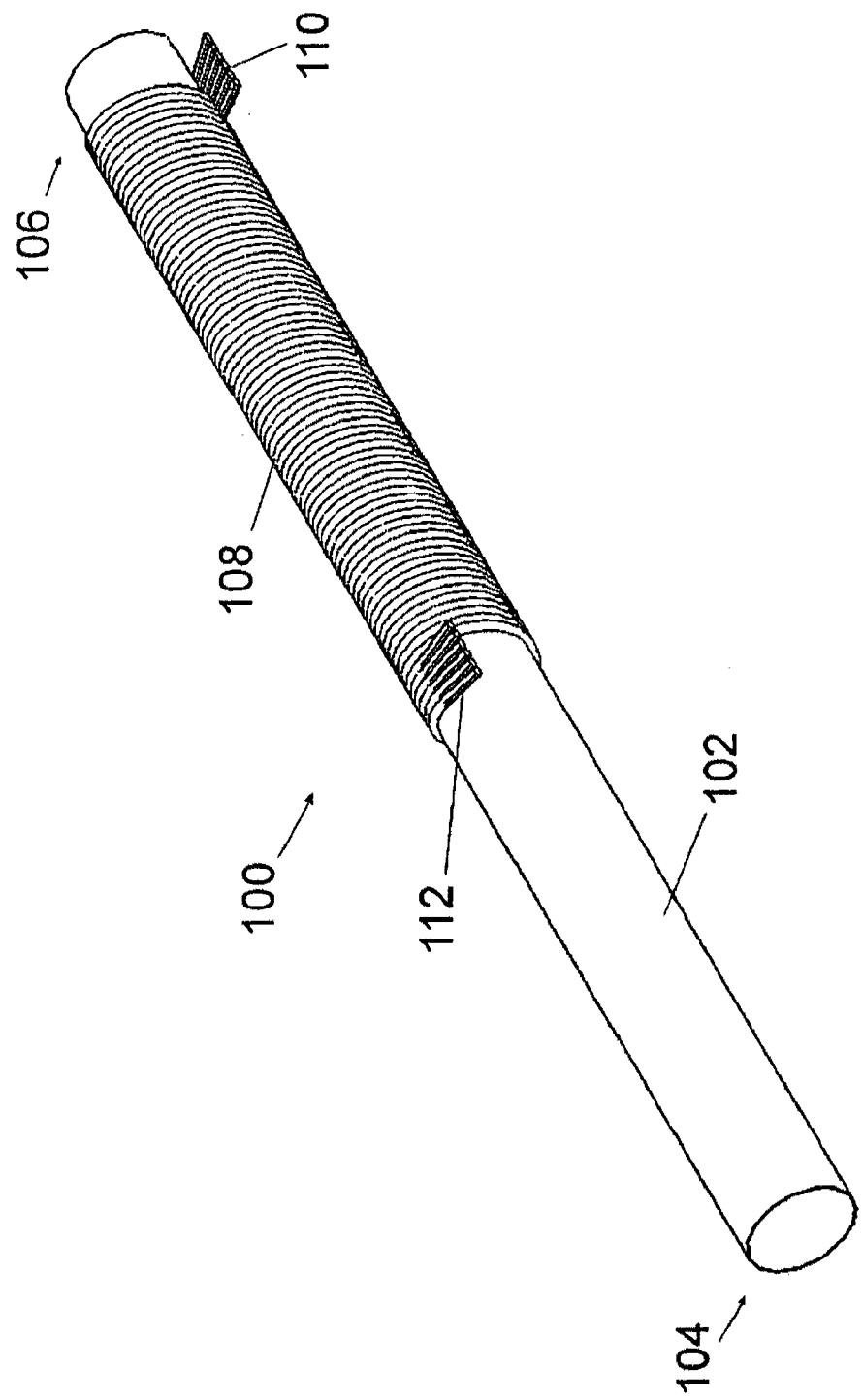
FIG. 3 illustrates a perspective view of a coil-on-tube heat exchanger according to another embodiment of the present invention.

FIG. 3 illustrates a coil-on-tube heat exchanger according to another embodiment of the present invention. As mentioned earlier, embodiments of the present invention provide that each of the plurality of coil tubes extends substantially along the same length of the center tube. In the embodiment of FIG. 2, the coil tubes 108 extend substantially along the entire length of the center tube 102. However, this is not always desired. In the embodiment of FIG. 3, the plurality of coils extend substantially along the same length of the center tube 102, but do not extend substantially along the entire length of the center tube. This embodiment illustrates that the helix formed by the plurality of coil tubes 108 can start part way along the center tube 102, and can end part way along the center tube 102.

In this particular embodiment, the helix of five coil tubes extends along about half the length of the center tube 102. The coil tube inflow ends 110 of the coil tubes 108 are provided substantially at the center tube outflow end 106, and the coil tube outflow ends 112 are provided at a point along the length of the center tube 102, such as about half-way along in the case of FIG. 3.

An implementation such as in FIG. 3 is advantageous for certain applications. For instance, in a situation where a heat exchanger according to an embodiment of the present invention is to be installed in a house having abrupt elbow joints, the heat exchanger of FIG. 3 may preferably be used. Having a bare center tube 102 to mate with the elbow permits a better and more even drain water coating of the inside wall of the center pipe if a leading edge is provided, as opposed to the helix extending along that portion. Moreover, the coil tubes 108 contribute the majority of the weight and material cost of a heat exchanger according to embodiments of the present invention. Therefore, in situations where having the helix extend only along a portion of the length of the center tube is needed or preferred, this can result in cost savings in terms of heat exchanger production.

Figure 4:
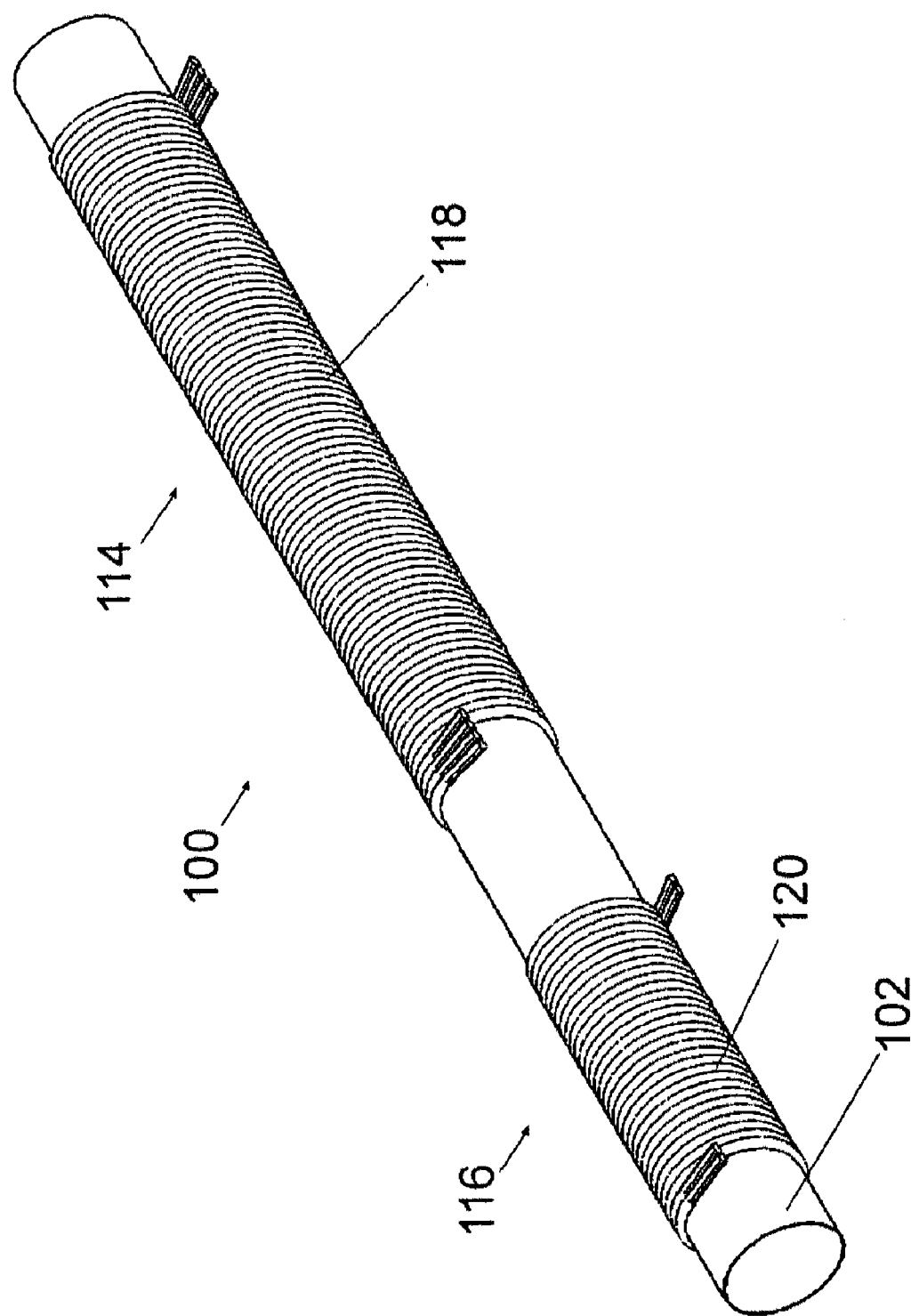
FIG. 4 illustrates a perspective view of a coil-on-tube heat exchanger according to a further embodiment of the present invention including a plurality of helixes.

The embodiments described in relation to FIG. 2 and FIG. 3 show a heat exchanger with a single helix formed by the plurality of coil tubes 108. Further embodiments of the present invention include a plurality of such helixes. FIG. 4 illustrates a heat exchanger according to a further embodiment of the present invention including a plurality of helixes. A first and second helix 114 and 116 include a first and second plurality of coil tubes 118 and 120, respectively. As illustrated in FIG. 4, the helixes can be of different lengths, and can include a different number of coil tubes. For example, helix 114 extends along about ⅔ of the length of the center tube 102 and includes four coil tubes 118, while helix 116 extends along about ⅓ of the length of the center tube 102 and includes two coil tubes 120.

An implementation such as in FIG. 4 is advantageous for certain applications, such as some industrial applications, in which a first liquid flow and a second liquid flow may be advantageously kept at different temperatures. For instance, a first liquid flow can be used for cleaning floors, and is desired to be kept at a high temperature. A second liquid flow can be used for another process, such as a chemical process, in which the liquid temperature is to be kept within a certain temperature range, for example below 30 degrees Celsius. In such a case, an embodiment of the present invention such as illustrated in FIG. 4 can advantageously be employed, providing the advantages of the present invention, with some of the flexibility of feeding separate liquid flows as in FIG. 1. Moreover, manufacturing of smaller helixes can be easier, and may be preferable when a high number of parallel coils is used. As illustrated in FIG. 4, the helixes need not cover the entire length of the center tube 102. Such an implementation can be useful in situations where physical limitations exist in a location where the heat exchanger is to be installed, and it may not be necessary to have the coil tubes covering a particular portion of the center tube.

The coil tubes 108 are not limited to tubes of the same cross-section or of any specific cross-section. Any number of tubes of differing cross-sectional shapes/profiles and sizes may be coiled in parallel to form the heat exchanger. In a preferred embodiment, the coil tubes 108 are of substantially equal, or substantially similar, cross-sectional area so as to treat a substantially similar volume of flow through each tube. However, in alternative embodiments of the present invention, each coil tube 108 can be of differing cross-sectional size and profile. The plurality of coil tubes can each have a substantially similar cross-sectional profile, such as a cross-sectional profile that is substantially rectangular or substantially annular. The cross-sectional profile can alternatively have a flat surface at an interface with the center tube, and not necessarily have a flat surface on the parts that do not interface with the center tube. The cross-sectional profiles can be dimensioned so that each coil tube is for receiving a substantially similar volume of liquid flow. The plurality of coil tubes can be of substantially equal size and/or length.

The plurality of coil tubes 108 can be referred to collectively as a helix. The pitch of the helix can preferably be adjusted according to the number of coil tubes being used, so that the distance between wraps and coil tubes is minimized, though this space may be varied and need not be constant. Thus the plurality of coil tubes can be wrapped around the center tube most efficiently without leaving significant space between succeeding wrappings of tube and thereby making maximum use of the heat transfer area available. In other words, the plurality of coil tubes is preferably arranged in a helix such that there is minimum space between each of the plurality of coil tubes. As compared to prior art single coil-on-tube heat exchangers, and those that use multiple coils each covering a different longitudinal area of the center tube, embodiments of the present invention have a pitch that is higher. For example, when each of the coil tubes is of the same width, in between each ring or wind of a particular coil tube are provided the other(s) of the plurality of coil tubes.

Figure 5:
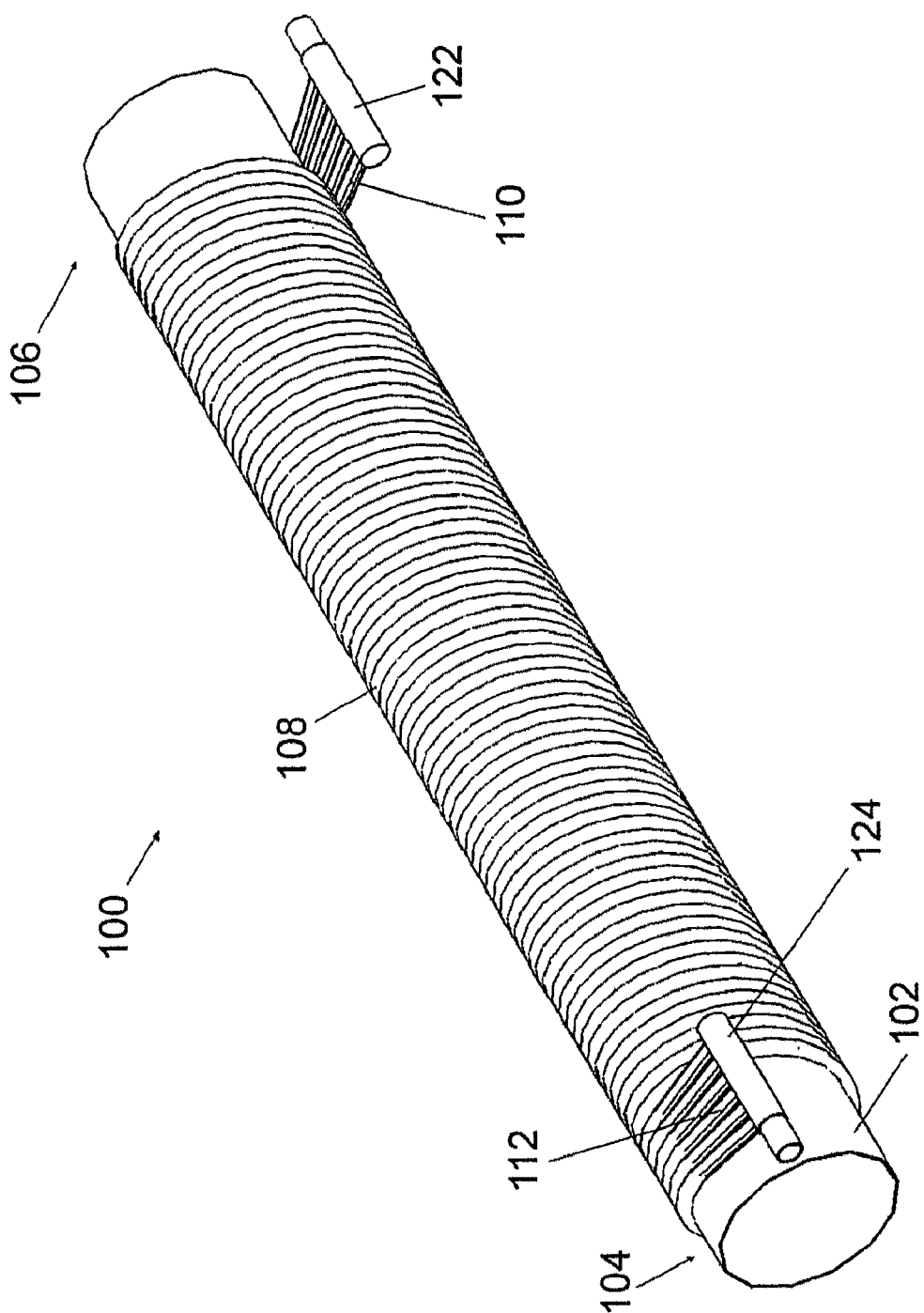
FIG. 5 illustrates a perspective view of a coil-on-tube heat exchanger according to another embodiment of the present invention, including an inflow header and an outflow header.

A particular embodiment is provided in FIG. 5, which shows a perspective view of a counter-flow coil-on-tube heat exchanger according to an embodiment of the present invention, including a header or manifold. The embodiment in FIG. 5 illustrates a counter-flow coil-on-tube heat exchanger with six parallel coil tubes 108. The flow of liquid is split, in this embodiment, at an inflow end of the helix, using an inflow header 122, to the plurality of coil tubes 108. The inlet header can thus split incoming liquid flow into a plurality of parallel flows for travel along a substantially similar path around the helix in the plurality of coil tubes. A similar outflow header 124 mixes the multiple flows in the plurality of coil tubes 108 back into a single flow at the outflow end of the helix. As mentioned earlier, the inflow end of the helix is preferably provided at or near the center tube outflow end 106, and the outflow end of the helix is preferably provided at or near the center tube inflow end 108. The incoming liquid flow is thus split into a plurality of parallel flows that travel a substantially similar path around the helix, in a direction opposing that of the flow through the center tube. Relative to prior designs having a single helical coil, the loss in pressure as the liquid travels through the coil tubes is much lower.

It is worth noting that a header, or manifold, or a plurality thereof can be provided with any of the embodiments of the present invention. For instance, a pair of inflow and outflow headers can be suitably used with the embodiment shown in FIG. 4.

Of course, a heat exchanger according to embodiments of the present invention does not need a header to operate. For example, the plurality of coil tubes can have many different liquid inputs. As such, each of these different liquid inputs can benefit from the heat exchanger, without having to be processed together. The different liquid flows in the plurality of coil tubes can each be processed separately at the inlet and outlet ends of the helix. Also, there can be any combination of headers (zero to many) at the inlet and outlet.

For convenience, the presently preferred embodiment of the present invention uses standard available sizes and diameters of copper tube. Of course, any other tube diameter, shape, or material may be used for the center tube or coil tubes. As larger contact areas between each of the plurality of coil tubes 108 and center tube 102 aid heat transfer, the preferred embodiment of the invention includes helical coil tubes having a substantially flattened, or rectangular, cross-sectional profile. Although this feature is preferred for reasons of performance, the cross-sectional profile of the coil tube is by no means limited to this shape for the present invention.

Figure 6:
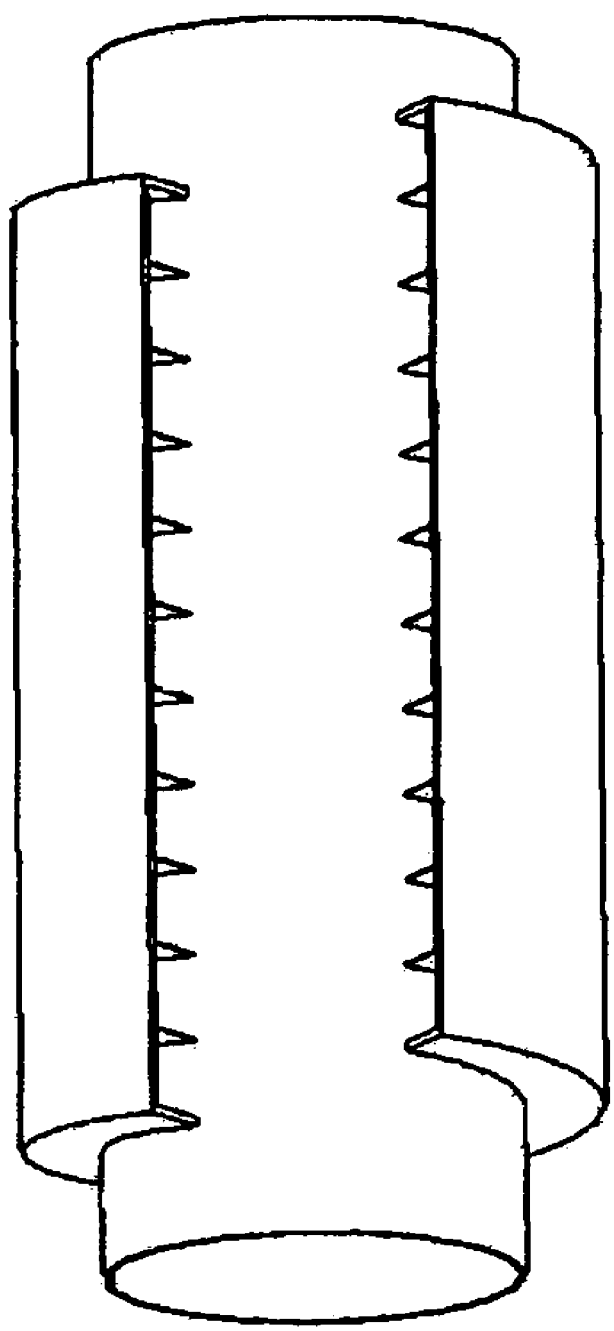
FIG. 6 illustrates a coil-on-tube heat exchanger according to a further embodiment of the present invention.

In order to limit liquid pressure losses to a modest quantity for different sizes of heat exchangers, the present embodiments of the invention use different numbers of coil tubes. Although presently preferred embodiments use 2 to 6 coil tubes, the invention is not limited to this range. For example, an embodiment of the invention can have a multiplicity of coil tubes that is the maximum number that can be wound around the center tube, so that essentially the heat exchanger has a series of "rings" up the tube, since each coil tube would only complete a single wrapping of the center tube. FIG. 6 shows one such an embodiment wherein the heat exchanger is designated generally with reference numeral 200 and coil tubes or channels are identified with reference numerals 202. A header or manifold is not shown in order to illustrate that each of the plurality of coil tubes only completes a single wrapping of the center tube.

Due to the production process, the presently preferred embodiment of the invention uses coil tubes that are wrapped around the center tube in a counter-clockwise direction. Wrapping the coil tubes in a clockwise direction would still fall into the scope of the present invention. The coil tubes are preferably anchored to the center tube at each end by an anchor. The anchors can be provided at the inlet end and/or the outlet end of each of the coil tubes. The anchor can be provided by any suitable means, such as brazing or welding, in order to maintain the tension in the tubes that will keep them wrapped tightly around the pipe and thereby ensure good thermal contact.

In summary, a coil on tube heat exchanger is provided that uses multiple parallel helical coil tubes to limit liquid pressure losses while providing at least similar performance and production times to previous coil and tube designs. A plurality of coil tubes are helically wrapped together around a center tube in parallel with each other, thereby forming a counter-flow heat exchanger. The system can include a header, or manifold, to connect two or more of the coils together at the beginning and/or end of the tube. However, each individual coil can alternatively be connected to a separate load and kept independent, and therefore a header is not required for the functioning of the invention. Embodiments of the present invention advantageously provide reduced pressure loss, higher performance and are generally faster and easier to manufacture than prior heat exchangers.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for heating fresh water using heat recovered from drain water, the method comprising:
   providing a center tube for receiving the drain water;
   providing a plurality of conduits for receiving the fresh water, the conduits of the plurality being helically wrapped in side-by-side relation along at least a portion of the length of the center tube so as to form alternating turns thereabout in such a way as to minimize the spacing between adjacent conduits, each of the plurality of conduits being in contact with the center tube such that the plurality of conduits only completes a single wrapping of the center tube to permit heat transfer therebetween;
   urging the drain water to flow through the center tube to thereby cause heat from the drain water to be transferred to the plurality of conduits via the center tube; and
   urging the fresh water to flow through the plurality of conduits to thereby heat the fresh water.

2. The method of claim 1 wherein:
   the drain water is urged to flow in a first direction and the fresh water is urged to flow in a second direction; and
   the first direction is substantially opposite the second direction.

3. The method of claim 1 wherein:
   the drain water is urged to flow in a first direction and the fresh water is urged to flow in a second direction; and
   the first direction is substantially the same as the second direction.

4. The method of claim 1 wherein the fresh water is urged to flow in a clockwise direction.

5. The method of claim 1 wherein the fresh water is urged to flow in a counter-clockwise direction.

6. The method of claim 1 wherein:
   each conduit of the plurality includes an inlet end for receiving fresh water and an outlet end for discharging heated fresh water;
   the method further includes the step of providing an inlet header in fluid communication with at least some of the inlet ends of the conduits; and
   the step of urging fresh water includes urging fresh water from the inlet header to flow into at least some of the inlet ends of the conduits.

7. The method of claim 6 wherein:
   the inlet header is in fluid communication with the inlet end of each conduit; and
   the step of urging fresh water from the inlet header includes urging fresh water from the inlet header to flow into the inlet end of each conduit.

8. The method of claim 1 wherein:
   each conduit of the plurality includes an inlet end for receiving fresh water and an outlet end for discharging heated fresh water;
   the method further includes:
      the step of providing an outlet header in fluid communication with at least some of the outlet ends of the conduits; and
      discharging the fresh water from at least some of the outlet ends of the conduits into the outlet header.

9. The method of claim 6 wherein:
   the outlet header is in fluid communication with the outlet end of each conduit; and
   the step of urging fresh water from the inlet header includes urging fresh water from the outlet end of each conduit into the outlet header.

10. The method of claim 1 wherein:
    each conduit of the plurality includes an inlet end for receiving fresh water and an outlet end for discharging heated fresh water; and
    the inlet ends of the conduits are co-located.

11. The method of claim 1 wherein:
    each conduit of the plurality includes an inlet end for receiving fresh water and an outlet end for discharging heated fresh water; and
    the outlet ends of the conduits are co-located.

12. The method of claim 1 wherein:
    each conduit of the plurality includes an inlet end for receiving fresh water and an outlet end for discharging heated fresh water; and
    the method further includes the step of mixing the heated fresh water discharged from the outlet ends of the conduits.

13. The method of claim 1 wherein the plurality of conduits extend substantially along the entire length of the center tube.

14. The method of claim 1 wherein each conduit of the plurality is selected from one of a tube, a pipe and a channel.

* * * * *